Oct. 25, 1960  K. J. HERSEY ET AL  2,957,708
LEVER SPRINGING WHEEL SUSPENSION
Filed May 5, 1958

INVENTORS
KENNETH J. HERSEY
ARTHUR J. HERSEY
BY
H. J. Woodward
atty.

United States Patent Office 2,957,708
Patented Oct. 25, 1960

2,957,708

LEVER SPRINGING WHEEL SUSPENSION

Kenneth J. Hersey, 15009 Crestview Lane, Hopkins, Minn., and Arthur J. Hersey, 3017 Bryant Ave. S., Minneapolis, Minn.

Filed May 5, 1958, Ser. No. 732,863

1 Claim. (Cl. 280—124)

This invention relates to improvements in vehicle wheel suspensions for trailers and the like in which the wheel is free to move vertically relative to the trailer and in which such movement is resisted by compressing a cushion member which absorbs shock applied to the wheel.

An object of the invention is to provide a vehicle wheel suspension in which there is associated therewith suitable braking means.

These and other more detailed and specific objects will be disclosed in the course of the following specification, reference being had to the accompanying drawings, in which—

Figure 1 side elevational view with parts broken away of a wheel suspension;

Our invention can be employed with conventional form of trailer having frame 10. A trailer similar to that shown in Patent 2,526,866 may be employed. It is to be understood that we may employ our improved lever spring adjustable load wheel suspension with other types of vehicles.

Figure 1:
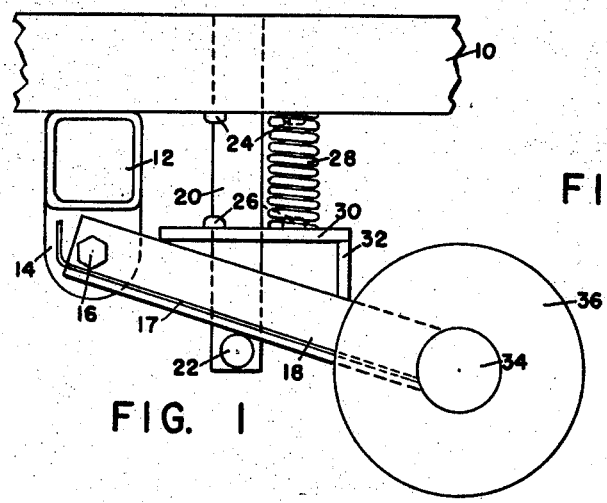
Figure 2:
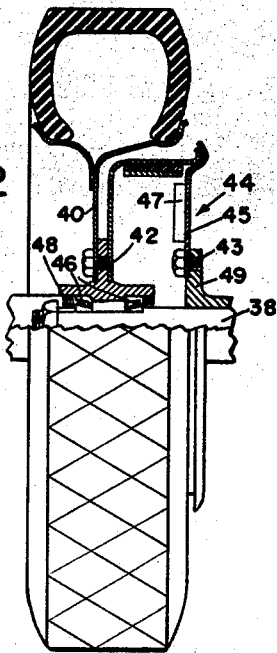
Figure 2 is a view of a single wheel to be used in accordance with this invention with parts broken away showing position of brake housing.

The vehicle of whatever kind will be provided with load carrying member 12 with a depending support or shank 14 which acts as support for the wheel suspension and while only one support for the wheel suspension is shown, it will be understood that the units at the opposite sides of the vehicle will be identical and further, that a single wheel suspension may be used. The shank 14 has lever arm 18, pivotally mounted at 16. Secured to load carrying member 12 is upper spring arm 10, which would be a part of the vehicle frame, see Figure 1 from which depends bracket 20 which has a stop member 22 adjacent the lower end. Mounted on lever arm 18 is lower spring arm 30 which includes vertically extending portion 32 and a horizontally extending portion. Obviously the spring arm 30 may be welded or otherwise rigidly attached to arm 18. The upward movement of the arm 18 at its rear end is yieldably resisted by one or more cushioning means, such as coil spring 28. The coiled spring or springs are braced between the horizontal member 30 and member 10. As shown one spring 28 is employed and to removably accommodate the spring, there is provided a plurality of bosses 26 and 24, over which ends of the spring 28 may be placed. It will be noted that there is provided a plurality of bosses 26 and 24 in spaced horizontal relation thus allowing the adjustment of the spring or springs to different positions with respect to the pivot 16 of the arm 18. It should be understood that the spring or springs may be adjusted in position to vary the resistance to upward movement of the wheel or wheels 36 in accordance with the load thereon. To change the position of the spring or springs 28 which are under compression, the vehicle is jacked up allowing the arm 18 to move downwardly at its free end. As previously pointed out the downward movements of the arm 18 are limited by removable stop rod member 22 so that the spring or springs 28 cannot escape from their seats.

The stop rod member 22 will have no effect on the upward and downward movement of the arm 18 while the vehicle is in use. It will be understood that spring 28 will absorb road shocks and will allow the wheel to travel over a road surface without substantial up and down vibration being transmitted to the vehicle.

The size of and loads being carried by trailers are increasing which requires that braking means be provided in association with the wheel or wheels 36. The brake means will have to be electric, hydraulic or the like. From the brake housing 44 extends conduit 17 and then along lever arm 18 and then to suitable control station usually positioned in an automobile adjacent the drivers position therein.

Flanges on an axle housing or brake housing indicated at 44 include backing plate 45, and flange 49 attached to the plate at 43. The flange 49 is shown as an integral part of the axle housing 50 and has the spring lever arm 18 attached thereto. It is to be understood that where a single wheel is to be used, the lever arm 18 can be used with single flange 49 or with a flange 49 on both sides of axle housing 50. In the event it is desirable to equip a vehicle having single wheel mountings with additional wheels for greater carrying capacity, this may be accomplished by the addition of a wheel on axle 38. The axle 38 turns in the axle housing supported by bearings 46 and associated with the bearings is oil seal 48. It is to be understood that any suitable braking mechanism may be positioned in brake housing backing plate 44. The lever arm being a part of the flange 49 operatively connects the wheel 36 to the vehicle frame. It is to be understood that the vehicle frame may be attached to the axle housing by other means for example as shown in Patent 2,033,298.

Figure 3:
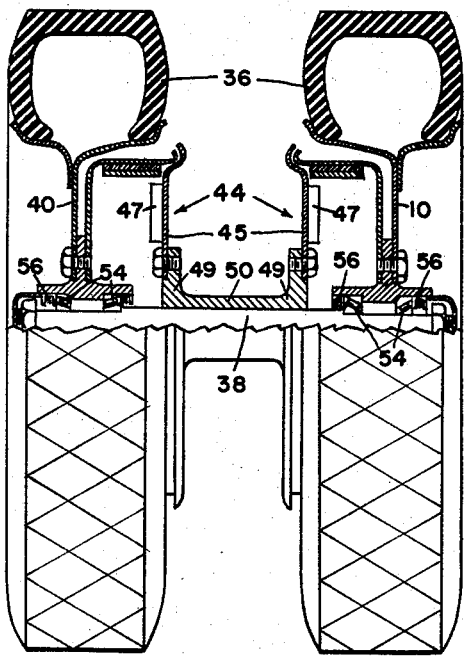
Figure 3 is a view of dual wheels independently mounted on fixed axle with parts broken away.

In Figure 3 the axle 38 is fixed in the axle housing and associated with the axle are bearings 54 in each of the dual wheels. In this arrangement each wheel moves independently so that on a sharp turn there will be no sweep or drag due to turning radius. This arrangement is ideal for boat trailers and the like that may be operated over soft sand or terrain.

Figure 4:
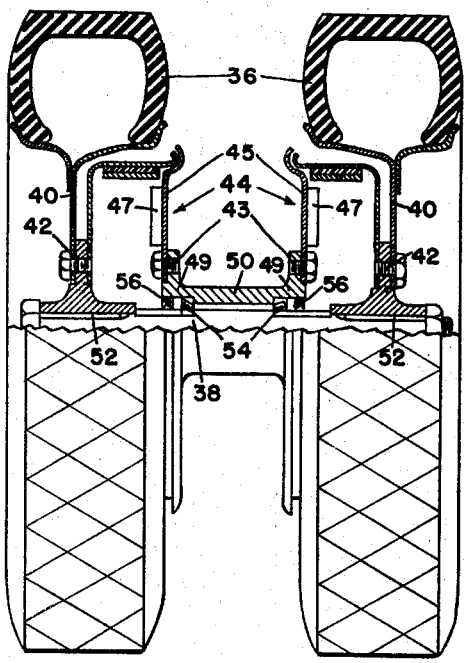
Figure 4 is view similar to the dual wheels shown in Figure 3 with modified mounting of the wheels upon the axle; both keyed to axle member.

Figure 4 shows a dual arrangement of wheels to be attached to lever arm 18. The arrangement in Figure 4 is similar to that of Figure 3 with the exception that the wheels 36 are both keyed to axle 38 at 52. This last mentioned arrangement has the disadvantage that in a sharp turn the wheels sweep or drag due to variation in the turning radius. In Figures 3 and 4 oil seals 56 are employed.

It is to be understood that only one brake housing may be used instead of the two shown in Figures 3 and 4. Under some loads only one brake associated with a dual wheel would be sufficient. As the weight of boats and other loads is increased braking means will have to be provided with the trailer wheels.

It is to be understood that suitable modification may be made in the structure as disclosed, provided such modification comes within the spirit and scope of the appended claims.

What is claimed:

In a vehicle wheel suspension, a load carrying member, a support depending from the said load carrying member, an arm member pivotally attached to one end of the depending support member and extending rearwardly and downwardly, a ground wheel supporting the other end of the said arm member, stop means disposed beneath the said arm member to limit downward movement of the said wheel, a horizontally extending upper spring arm, a lower horizontally extending spring arm generally parallel to the upper spring arm, said lower spring arm connected at one end to the said arm member and supported at the other end by a vertically extending bar attached to the said arm member, spring rests arranged along the upper spring arm and the lower spring arm and at least one coil spring engaging a selected pair of said spring rests for yieldably resisting upward movements of the wheel.

References Cited in the file of this patent
UNITED STATES PATENTS

| | | |
|---|---|---|
| 1,542,179 | Sanford | June 16, 1925 |
| 2,507,980 | Knapp | May 16, 1950 |
| 2,526,866 | Hersey | Oct. 24, 1950 |
| 2,635,896 | Tantlinger | Apr. 21, 1953 |
| 2,773,699 | Grumman | Dec. 11, 1956 |
| 2,862,724 | Stover | Dec. 2, 1958 |